(No Model.)
E. v. REISS.
APPARATUS FOR REMOVING THE IMPURITIES FROM SMOKE.
No. 517,297. Patented Mar. 27, 1894.
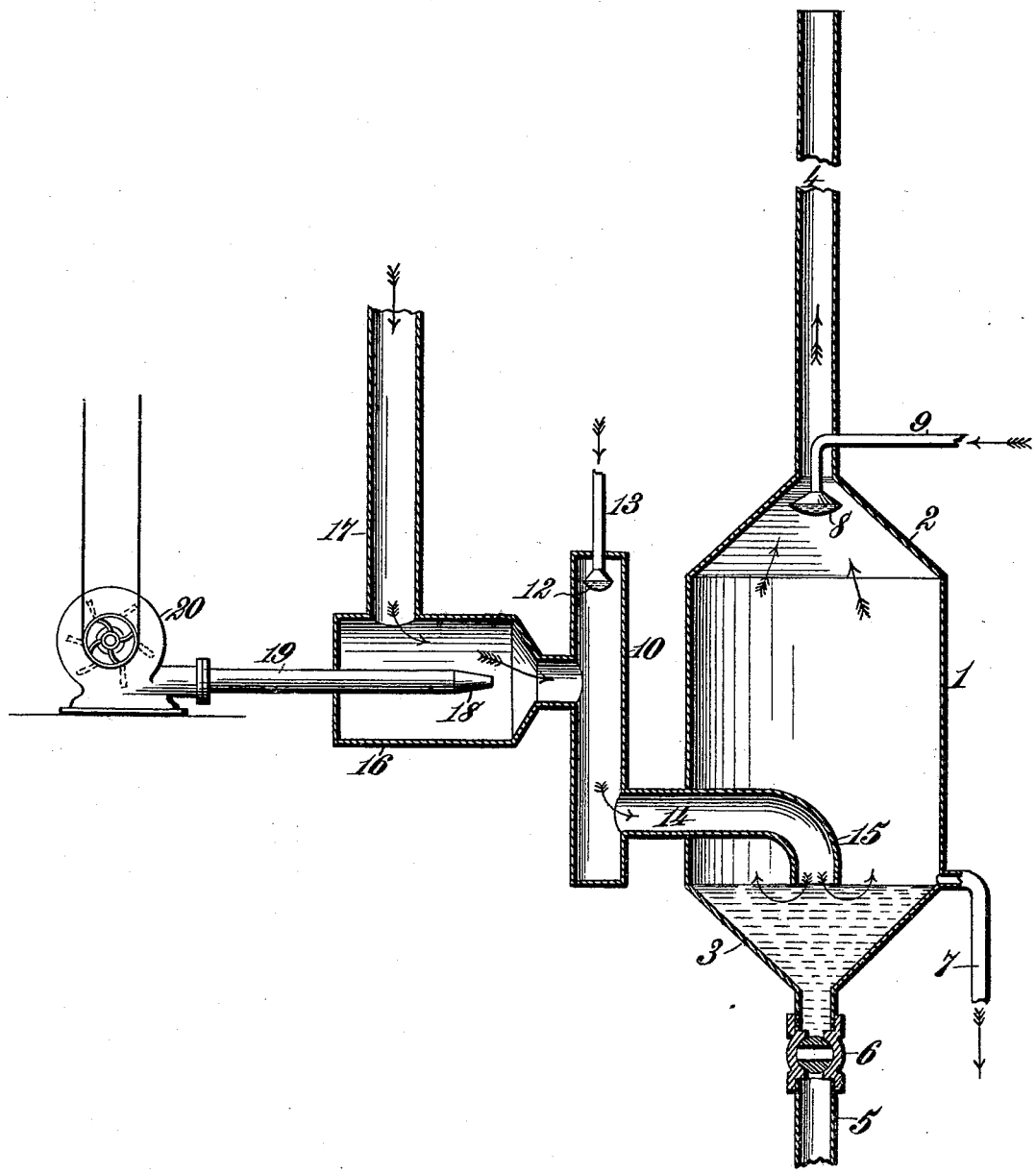
Witnesses.
Inventor:
Ernest V. Reiss.
By James L. Norris.
Atty.

UNITED STATES PATENT OFFICE.

ERNEST V. REISS, OF NEW ORLEANS, LOUISIANA.

APPARATUS FOR REMOVING IMPURITIES FROM SMOKE.

SPECIFICATION forming part of Letters Patent No. 517,297, dated March 27, 1894.

Application filed October 9, 1893. Serial No. 487,678. (No model.)

*To all whom it may concern:*

Be it known that I, ERNEST V. REISS, a citizen of the United States, residing at New Orleans, in the parish of Orleans and State of Louisiana, have invented certain new and useful Improvements in Apparatus for Removing Impurities from Smoke; and I do hereby declare that the following is a full, clear, and exact description of the same, reference being had to the annexed drawing, making a part of this specification, and to the figures of reference marked thereon.

This invention has for its object to provide a novel, simple, efficient, and economical apparatus for extinguishing sparks and depositing carbonaceous, sulphurous, and other matters carried in smoke or products of combustion from boiler and other furnaces.

To accomplish this object my invention consists in the features of construction and the combination or arrangement of devices hereinafter described and claimed, reference being made to the accompanying drawing, in which the figure is a vertical central sectional view of an apparatus constructed in accordance with my invention for removing impurities from smoke.

In order to enable those skilled in the art to make and use my invention, I will now describe the same in detail, referring to the drawing, wherein—

The numeral 1 indicates a spark-settling and extinguishing vessel, which may be cylindrical in form and be provided with conoidal upper and lower ends 2 and 3 communicating respectively with a smoke stack or escape chimney 4, and a water, cinder, and spark discharge tube 5 having a valve or cock 6. The lower end of the vessel is designed to contain a body of water, at the level of which is arranged a surface drain and water-overflow tube 7, so that the water cannot rise above this point, and any matter floating on the surface of the water will pass off through the tube. In the upper portion of the vessel is arranged a water-spray 8 connected with a water-supply pipe 9, so that water may be caused to descend in a shower through the vessel.

A vertically arranged smoke-condensing tube 10 is arranged in juxtaposition to the spark-settling and extinguishing water-vessel 1, and the upper end of the smoke-condensing tube contains a water spray 12 connected with a water-supply pipe 13. The lower end of the tube 10 is provided with a tubular connection 14 extending into the vessel 1 and having an elbow or pendent inner end 15 which terminates in juxtaposition to the level of the water in the vessel 1. The tube 10 also connects laterally with an enlarged injector chamber 16 communicating with a vertically or suitably arranged smoke-inlet pipe 17, and containing an air or other injector 18 which connects by a pipe 19 with a suitable blower 20, by which air or other fluid can be forced through the injector, for the purpose of creating a suction which draws the smoke downward through the pipe 17 and forces it into the vertical smoke-condensing tube 10, wherein the smoke is subjected to a descending shower of water from the spray 12 which condenses the smoke. The smoke, sparks, and cinders then traverse the tubular connection 14 and discharge into the body of water in the lower end of the vessel 1, the sparks being completely extinguished and with the carbonaceous, sulphurous, and black and noxious matters settling in the body of water in the vessel 1, while the smoke ascends in the vessel and is subjected to a shower bath supplied by the spray 8. The smoke freed from black and noxious matters passes from the upper end of the vessel 1 into the smoke stack or escape chimney 4.

Having thus described my invention, what I claim is—

The combination of a spark-settling vessel containing a water spray in its upper portion and provided at its lower portion with a body of water and a surface drain and water-overflow, a smoke-condensing tube containing a water spray in its upper portion and having its lower portion provided with a tubular connection leading into the spark-settling vessel and discharging into the body of water therein, an injector chamber connected with the smoke-condensing tube, a smoke-inlet pipe communicating with the injector chamber, an injector arranged in the said chamber for forcing the smoke into the condensing tube, and a blower for supplying fluid under pressure to the injector, substantially as described.

In testimony whereof I have hereunto subscribed my name in the presence of two witnesses.

ERNEST V. REISS.

Witnesses:
SIDNEY G. COOK,
A. J. REID.